Aug. 17, 1965  J. RABINOW  3,201,752
READING MACHINE WITH MARK SEPARATION
Filed June 11, 1962  4 Sheets-Sheet 1

*Fig. 2a* Prior Register

*Fig. 2b* Register

INVENTOR
Jacob Rabinow

BY Joseph A. Genovese &
Max L. Libman

ATTORNEYS

Aug. 17, 1965  J. RABINOW  3,201,752
READING MACHINE WITH MARK SEPARATION
Filed June 11, 1962  4 Sheets-Sheet 2

INVENTOR
Jacob Rabinow

BY Joseph A. Genovese &
Max L. Libman
ATTORNEYS

Aug. 17, 1965  J. RABINOW  3,201,752
READING MACHINE WITH MARK SEPARATION
Filed June 11, 1962  4 Sheets-Sheet 3

INVENTOR
Jacob Rabinow

BY
ATTORNEYS

Aug. 17, 1965    J. RABINOW    3,201,752
READING MACHINE WITH MARK SEPARATION
Filed June 11, 1962    4 Sheets-Sheet 4

INVENTOR
Jacob Rabinow
BY Joseph A. Genovese &
Max L. Libman
ATTORNEYS

United States Patent Office 3,201,752
Patented Aug. 17, 1965

3,201,752
READING MACHINE WITH MARK SEPARATION
Jacob Rabinow, Bethesda, Md., assignor, by mesne assignments, to Control Data Corporation, Minneapolis, Minn., a corporation of Minnesota
Filed June 11, 1962, Ser. No. 201,376
12 Claims. (Cl. 340—146.3)

This invention relates to reading machines and particularly to improvements relating to the use of field (or other) marks by optical character reading machines, in a manner such that the marks do not interfere with the recognition procedures of the machines.

The art of optically identifying characters by machine has reached the point where several types of reading machines are commercially available. These machines can identify the characters on a typewritten page, on credit cards, and other documents. For example, a character reading machine to identify characters on printed-form waybills is now in use. The characters identified by this machine are typed on the form at locations prescribed by guide lines used as field marks. Therefore, the following description deals primarily with guide lines used as field marks, but it is to be understood that such field marks are given by way of examples only, and that my treatment of any other marks such as guide lines, columnar or row rulings, special symbols and even smudges, especially those having a reasonably regular pattern (as made by some printers and imprinters), is the same. Thus, the term "mark" is defined as any manifestation, extending beyond the spatial limits of the manifestations on a document (usually numbers, letters and symbols) to be read by machine.

The waybill reading machine was so designed that the electro-optical system discriminated the printed characters from the marks by having the marks of a color to which the electro-optical system is insensitive. The form was printed in red, the characters in black (from a typewriter), and the electro-optical system for character-reading was sensitive to black, but not red. The marks, in addition to providing guides for the typist, were helpful in the reading process by using a special electro-optical system sensitive to red, but not black. This required two separate electro-optical systems and control circuits to operatively associate the two.

One of the commercial areas where an optical reading machine is economically feasible is with printed-form documents. The reason is that printed forms used for accounting, sales, inventory, tax records, insurance records, banking, etc., all pertain to business and accounting matters where data relating thereto can advantageously be processed by computers. There is a reluctance on the part of the users of printed forms to change their forms merely to convenience a reading machine, and an even greater reluctance to use multi-color printed forms. Furthermore, even if the user of the forms consents to specified colors for form-printing, there are still at least three disadvantages. One is that due to the sensitivity of electro-optical systems there must be tight control over the ink or dye used in printing. Secondly, two separate electro-optical systems are required in the reading machine, one to detect the field (or other) marks and the other to detect the characters that are to be identified. And finally the typist must be careful to type the characters inside the guide lines.

Accordingly, an object of my invention is to provide a solution to this problem, which enables the reading machine to identify characters on a printed form having marks (of any kind) which are spectrally indistinguishable from the characters. In other words, the characters may be printed (as by a typewriter) in black, and the form may also be printed with black lines or other configurations of marks.

In carrying out my invention which may be used as a part of any reading machine, I have means which examine the character-defining data extracted from the document to ascertain the presence of a mark. When the mark is discovered, I provide a signal or signals which require the decision-making section of the reading machine to ignore the mark in determining the identity of the unknown character. The mark signal can be used in numerous ways between the examination device of the reading machine, usually a scanner, and the comparator. For example, the mark-defining data can be suppressed or otherwise inhibited at the scanner of the machine, at the register of the machine (if the machine has a register), at the correlation matrices in those designs where the machine uses correlation matrices, and in other places which will become evident to those skilled in the art as the description proceeds.

Although field marks may be of any configuration, vertical lines are often encountered because it is common practice for forms to have ruled lines or boxes within which characters are typed, printed, hand written, etc. When these lines are spectrally indistinguishable from the characters, ordinary reading machines would have great difficulty because they would represent noise and worse, may be recognized as the numeral "1" or a lower case "l." A further difficulty envisioned is that a mark line may combine with a character to form an entirely different character as far as the character recognition machine is concerned.

For example, a vertical mark line touching the left edge of the character "3" would appear (to the machine) more like a "B" than a vertical mark and the numeral "3." A vertical mark line through the center of an "s" would in many fonts, be as much like a dollar sign as anything else. My invention automatically eliminates these difficulties and allows the field marks to be made spectrally the same or similar to machine-readable characters on a document.

The preceding discussion concerns the separation of marks from the character-defining data where the marks are spectrally indistinguishable from the characters. This allows the documents to be printed with the same color lines, guides, marks, etc., as the machine-readable characters. However, it is not a requirement that the marks and characters be formed in this way. My invention will operate just as well with documents having marks which are spectrally distinguished from the characters. I am emphasizing the former case only because it appears to be the more difficult to cope with.

Other objects and features of importance will become apparent in the following description of the illustrated forms of the invention.

FIGURE 2a is a diagrammatic view showing how the register of a conventional reading machine would be loaded when the character and left field mark in FIGURE 1a is scanned.

FIGURE 2b shows how a similar or identical register is loaded under the same conditions as FIGURE 2a, except, my invention has been incorporated therewith.

FIGURE 3b is a fragmentary view showing a modification involving an analog component which may be substituted for the digital column-gates of FIGURE 3a.

Figure 1:
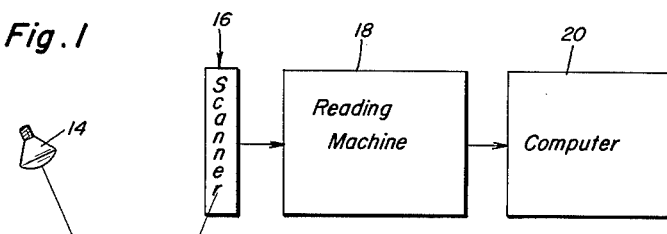
FIGURE 1 is a diagrammatic view showing a document having field marks, being scanned by a reading machine being used with a computer.
Figure 1:
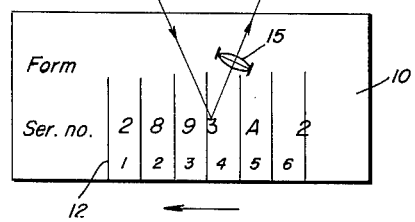

In the accompanying drawings, FIGURE 1 shows document 10 which is a pre-printed form with vertical marks 12 identifying fields 1–6 inclusive. As I have discussed previously, my invention makes it practical to have the field marks spectrally identical or similar to the machine-readable characters in the various fields. Thus, field marks 12 are pre-printed in the same color as the characters, usually black.

Although the document 10 can be moved in various ways to provide one component of scan motion, assume that the document moves to the left (as shown by the arrow) by means of a paper mover which forms no part of my present invention. As the document moves, the successive field marks and fields 1–6 inclusive will be illuminated by the light source 14 and an image of each field will be formed by lens 15 on the photo-sensitive surfaces of the photo-cells 1–16 (FIGURE 1a) of scanner 16. In the usual reading machine configuration, the scanner provides outputs (described in more detail later) which are conducted to logic circuits of the reading machine 18. The reading machine processes the scan data to provide outputs which identify the characters. These outputs can be buffered in any of the usual ways and/or gated "on line" into a computer 20.

Figure 2C:
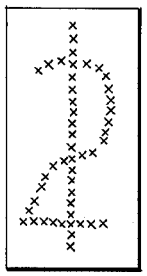
FIGURES 2c and 2d show another example of register-loading in a character recognition machine with (2d) and without (2c) my invention.
Figure 2D:
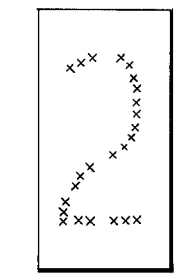
Figure 2:
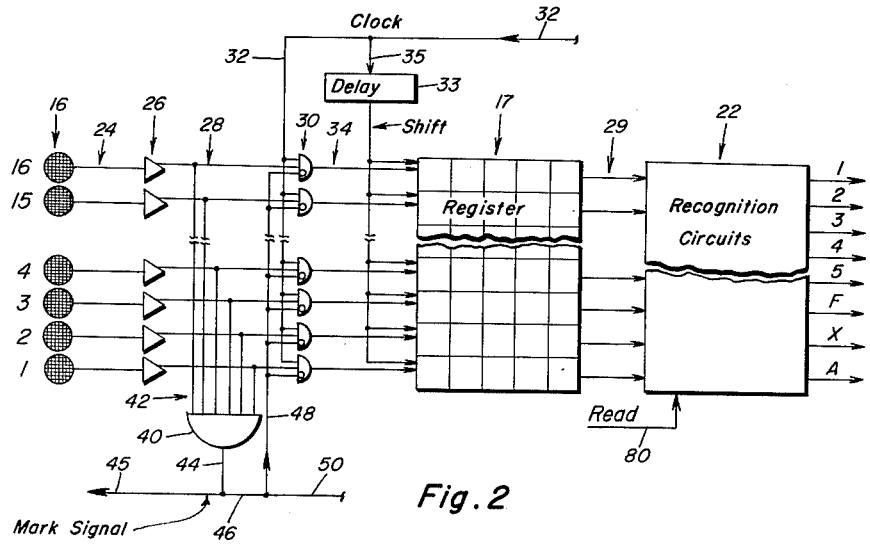
FIGURE 2 is a diagrammatic view showing in box form conventional reading machine subassemblies, and also showing one method of eliminating the field marks from consideration by the recognition circuits of the reading machine.

FIGURE 2 diagrammatically shows a reading machine composed of scanner 16, a register 17, and recognition circuits 22. Although not all reading machines with which my invention is operable, have a register (for instance the reading machine in my prior Patent No. 2,933,246 or the machine described in application Serial No. 115,267), the reading machine of FIGURE 2 is provided with register 17 to show that my invention may also be applied to machines having registers and also to help visualize comparative processing of information in the machine (FIGURES 2a–2d). For the purpose of my present invention it is assumed that register 17 is a continuous, horizontally loading register the same as disclosed in my pending application Serial No. 156,055. However, it will be later seen in connection with the FIGURE 3, for example, that the kind of register is in no way critical.

As disclosed in application Serial No. 156,055, a reading machine with a continuous register 17 can be constructed in the following way: a scanner 16 (e.g., composed of a row of photocells) can examine an area and provide outputs which correspond to the reflectance of the small sub-areas that are examined. For example, the output lines 24 of the individual photocells 1–16 conduct signals corresponding to light reflectance from the document, and these signals are amplified by quantizing amplifiers 26 whose outputs are on lines 28 to coincidence gates 30. Clock pulses on line 32 interrogate inhibit gates 30 which have the effect of clocking scanner 16 in time with the horizontal motion of document 10. The outputs of inhibit gates 30 are conducted on lines 34 to the input terminals of register 17. Shift signals for loading the data on lines 34 into registers 17 can be obtained from any suitable source, for instance, the clock pulses on lines 32, 35 can be used with a slight delay at 33. When data sufficient to define at least one character are loaded in register 17 and other conditions, forming no part of my present invention, are fulfilled, the recognition circuits 22 identify the unknown character. To schematically show this function, lines 29 interconnect the register and recognition circuits, and when a "read" signal occurs on line 80, circuits 22 are gated on to decide upon the identity of the character and provide character-identify signals on one or more of the output lines of the recognition circuits. The "read" signal on line 80 can be obtained in any of the ways known in the art, for example as in Patent No. 3,104,369.

Figure 1B:
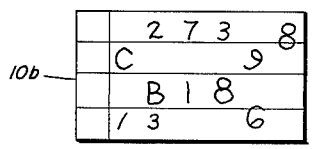
FIGURES 1b and 1c are views showing documents with other marks.
Figure 1C:
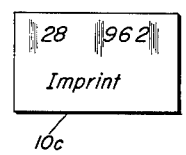
Figure 1C:
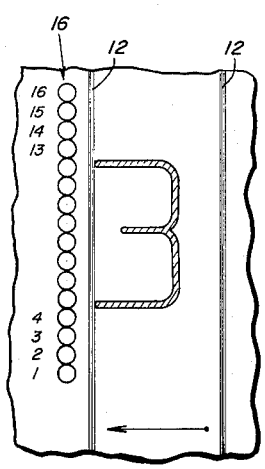
Figure 1A:
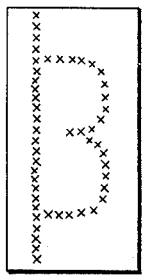
FIGURE 1a is a fragmentary enlarged view of a document with a photocell-row scanner superposed thereon showing one of many possible scanning procedures of reading machines with which my invention may be used.

When field marks 12 are not spectrally distinguishable from the characters, the field marks together with the characters will be stored in register 17. For instance, when the character "3" and the field mark to the left of it (FIGURES 1 and 1a) are scanned, both the field mark and the character will be stored in the register as shown in FIGURE 2a. When the numeral "2" in field #6 of document 10 is scanned, register 17 will be loaded as shown in FIGURE 2c. Obviously, the character "3" (FIGURE 2a) could easily be considered a B or an 8 or possibly a D. Corresponding confusion can exist in connection with the example given in FIGURE 2c. My invention overcomes this difficulty as follows:

In the embodiment of FIGURE 2, the photocell outputs conducted on lines 28 which pertain to the field marks are prevented from being loaded in register 17. Thus, instead of situations shown in FIGURES 2a and 2c, register 17 will have no difficulty in correctly identifying the characters "3" and "2." This is achieved in the following way: I have means to examine the outputs on lines 28 and to provide a signal when these outputs define a field mark 12. One of the simpler methods of examining the outputs on line 28 is to rely on a coincidence And gate 40 whose inputs are on lines 42 connected to respective lines 28. We can assume that a signal on line 28 defining "black" is +6 volts and a signal defining "white" on lines 28 is −6 volts, and gate 40 is a positive And gate (responding only to positive signals). Accordingly, when mark 12 to the left of FIGURE 1a is scanned, all inputs to gate 40 are satisfied and there is coincidence to provide a signal on line 44. This will be a "mark" signal which can be conducted on line 45 to be used in various ways in reading machine circuitry which form no part of my present invention. I wish only to point out that the field mark signal is available on line 45. As pertains expressly to my invention, the field mark signal is conducted on lines 46, 48, and to inhibit terminals of each of the gates 30. Thus, the field mark defining outputs on line 28 do not pass gate 30, and they are not loaded in register 17. At this point I could do several things. The first (not shown) is to simply ignore this scan (by inhibiting the shift signal on line 35), in which case there would be a slight horizontal compression of the character defining data in the register. This will do a little harm if the field marks 12 are very thin in comparison to the character itself, and the machine has high resolution. In practice, register 17 will contain many more elements than are diagrammatically shown, and the character-defining data stored in the register is generally spread over two and usually more register elements. In other words, the lines formed by the X's in FIGURES 2a–2d are diagrammatic and in practice, the lines defining the characters will generally be much wider. Therefore, the loss of a thin vertical row from the character width will only slightly effect character identity by the recognition circuit 2. Another way that the problem can be handled is shown in FIGURE 2. When the field mark signal is conducted on lines 46 and 48 it inhibits gates 30, after which the register 17 is horizontally shifted to the right by the shift signal on lines 32, 35. Another alternative is to use the signal on lines 46, 50 to trigger an "ignore" symbols into register 17 to replace the inhibited scan. The "ignore" symbols and their generator would be similar to those commonly used in the digital computer art. This procedure retains the correct character widths, with only a very slight loss of information as shown in FIGURES 2b and 2d.

Document 10c (FIGURE 1c) shows smudges in the line of characters. Imprinted documents, e.g., made by a credit card imprinter, often have smudges coextensive with, longer than, and located between characters. These are simply another form of mark within my definition of the word, and many can be separated as described above. When the smudge is wide as shown in FIGURE 1c, my circuits will treat the wide smudge as many adjacent vertical marks and will separate them on that basis.

Document 10b (FIGURE 1b) shows marks of another kind, i.e., made horizontally above or below (or both) the characters. These are separated from consideration in the decision of the character-identity in very much the same manner as the vertical marks. Instead of gate 40 and the inhibit feature of gates 30, I can use a counter (or shift register) for each line 28 (FIGURE 2) and count the "black" signals on each line 28. When the count exceeds the width of a character plus a few counts for horizontal extent of the mark, the counter provides a signal to clear the corresponding horizontal tier of register 17. In such a system the "read" trigger signal on line 80 for circuits 22 would reset all counters.

Figure 3B:
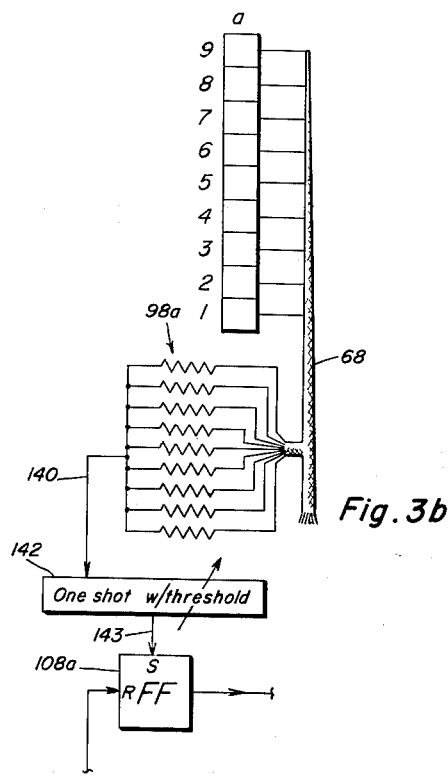
Figure 3C:
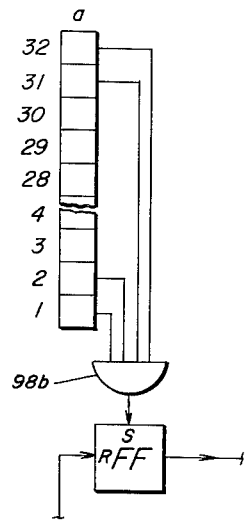
FIGURE 3c is a diagrammatic view showing another modification of one of my circuits to detect the presence of a mark and provide a signal indicating the existence of the mark.
Figure 3:
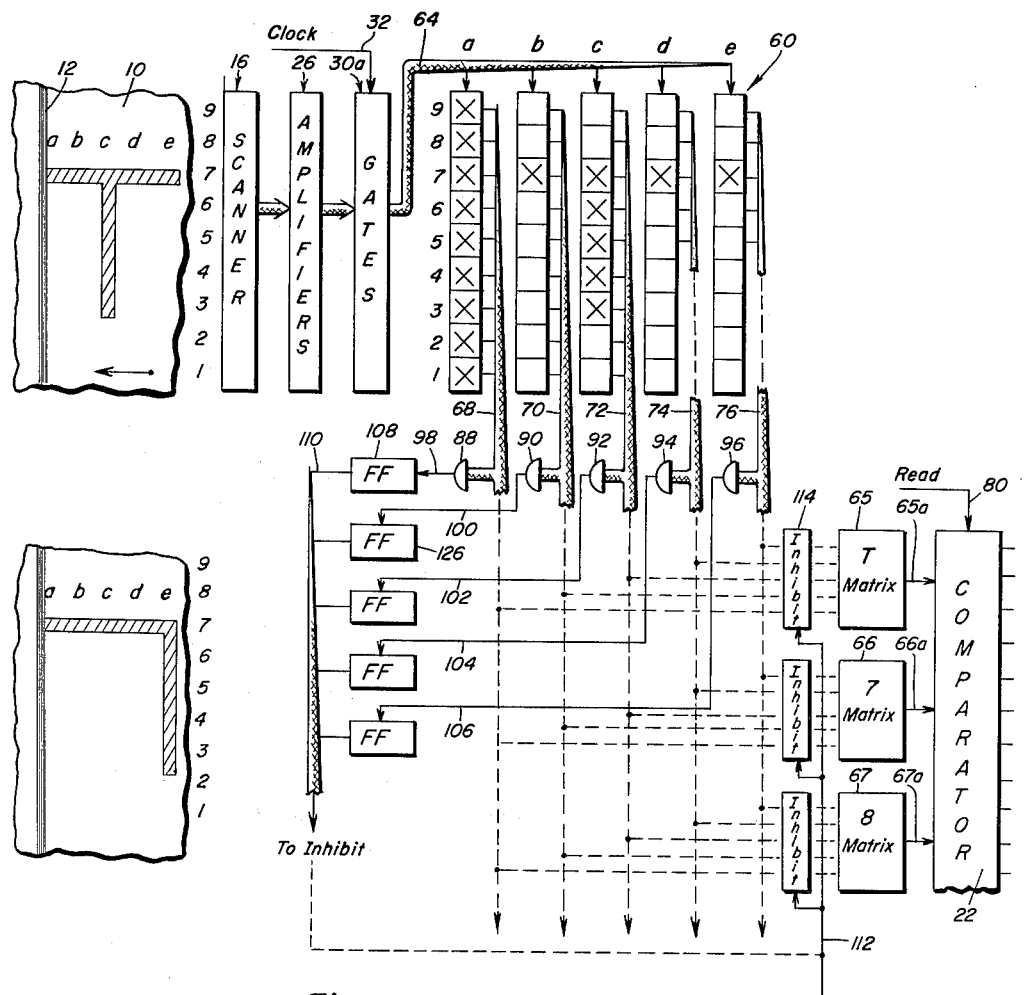
FIGURE 3 is a diagrammatic view schematically showing a reading machine which is constructed somewhat differently from the reading machine of FIGURE 2 and also showing the principles of my invention being practiced in such a way that the field marks are excluded in a different portion of the reading machine from that of FIGURE 2.
Figure 4:
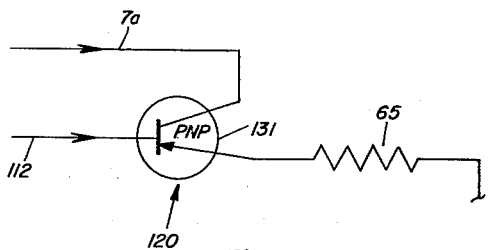
FIGURE 4 is a diagrammatic view showing one of the many possible configurations of inhibit gates that can be used in many of the forms of my invention.

Attention is now directed to FIGURES 3–4 where a slightly different kind of reading machine is diagrammatically illustrated. This machine is constructed more like the machines disclosed in the Patent No. 3,104,369. Document 10 with marks 12 (FIGURE 3) is moved horizontally to the left and the image of the field containing the character "T" sweeps across the face of scanner 16 whose outputs are amplified at 26 and gated at 30a into shift register 60. Gates 30a are coincidence And gates which are clocked by the signal on line 32 for the same reason as described in connection with gates 30 of FIGURE 2. However, in this form (FIGURES 3–4) gates 30a need not be inhibit gates as in FIGURE 2.

Register 60 can be constructed like the register shown in Patent No. 3,104,369, in which case it is loaded column-by-column with the information outputs on the conductors of cable 64. Scan a is loaded into column a, scan b is loaded into column b, scan c into column c, etc. Thus, the field mark 12 (in FIGURE 3) is stored in column a of register 60.

In this type of reading machine the data stored in register 60 is conducted in the form of electrical signals to correlation matrices 65, 66, and 67, etc., there being at least one correlation matrix for each character to be recognized. Cables 68, 70, 72, 74, and 76 are shown connected to the various stages of register 60, and the conductors thereof are selectively connected with the various matrices as shown in detail in FIGURE 3a. For example, for the character "T" lines 7a–7e inclusive, of cables 68–76 and 6c–3c inclusive, of cable 72 are connected to the corresponding stages of the shift register and to the resistors of matrix 65. For the character "7" the conductors in cables 68–76 attached to stages 7a–7e and 6e–3e inclusive are connected with the resistors of matrix 66. The effect is that output signals on lines 65a and 66a are proportional to the degree of match of the unknown character stored in register 60 and their particular matrices which are designed to recognize the specific characters T and 7. The other matrices (not shown) are designed to recognize specially for the other characters to be recognized, and the wiring connections with the register stages are selected in the same manner as described for the T and 7. Lines 65a, 66a, 67a, and the others (not shown) are connected with the recognition circuits 22 diagrammatically represented as a comparator, and this is triggered by a "read now" trigger signal on line 80 to identify the unknown character. The trigger signal on line 80 can be obtained as disclosed in Patent No. 3,104,369.

Figure 3A:
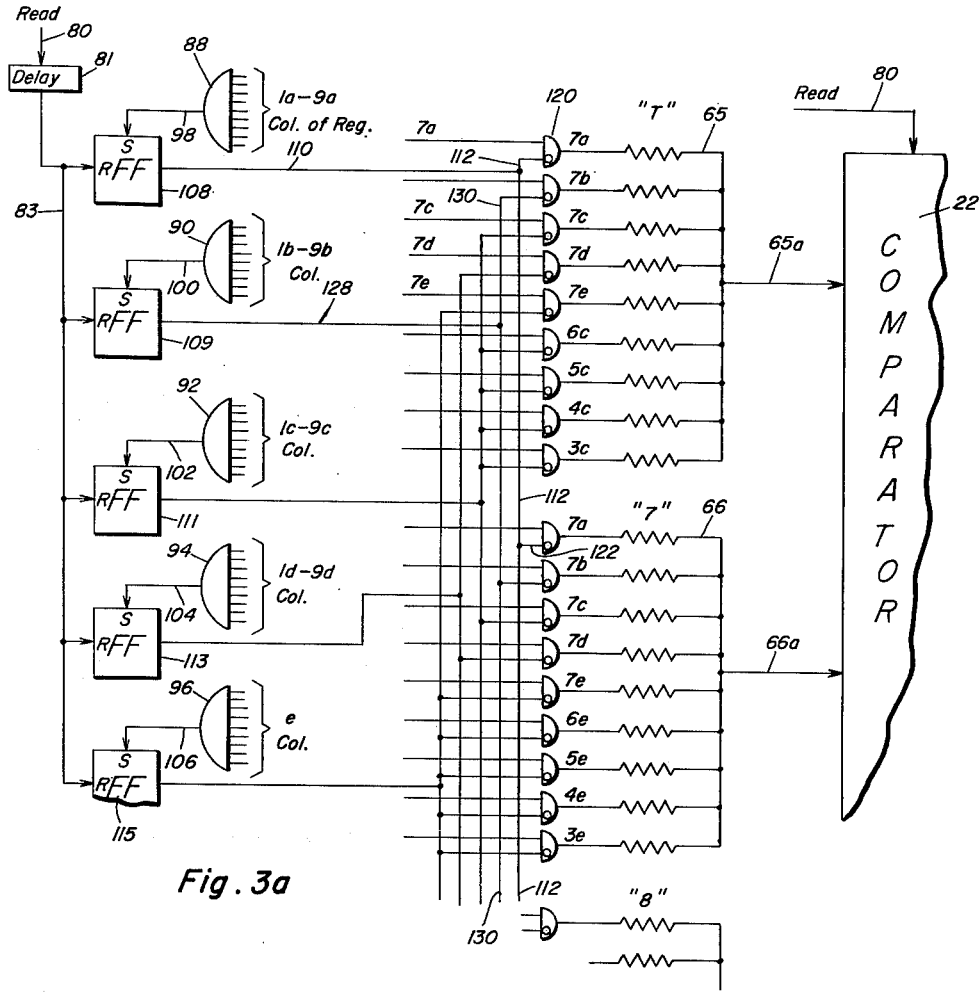
FIGURE 3a is a fragmentary enlarged view showing in greater detail the correlation matrices of FIGURE 3 and the application of my mark elimination system.

My mark separation system is applied to this type of reading machine in a slightly different way from that disclosed in FIGURE 2, although I could achieve my objectives in a machine like that of FIGURE 3 in the same way as shown in FIGURE 2. Instead of inhibiting the scanner outputs which define a mark, before reaching the register as shown in FIGURE 2, I load the field mark defining outputs (see column a of register 60 in FIGURE 3) but prevent data from having any effect on the decision-making procedure of my machine. One way of doing this is to inhibit all outputs from the particular column of register 60 which stores the mark. The general way of doing this is shown in FIGURE 3, and the same thing is shown specifically in FIGURE 3a. I have interrogation And gates 88, 90, 92, 94, and 96 connected with all of the conductors in respective cables 68–76, there being one gate for each column of register 60. When there is coincidence at these gates, there will be a mark signal on the appropriate line 98, 100, 102, 104, or 106 depending on where the mark is stored in the register. In the example, the mark is stored in column a and therefore the mark signal (output signal of gate 88) is conducted on line 98. This sets a flip-flop 108, there being an individual flip-flop for each of the lines 98–106 inclusive. The output line 110 of flip-flop 108 is connected to a bus 112 (the right side of FIGURE 3) to energize inhibitors 114 (there being diagrammatically shown one inhibitor for each matrix 65, 66, 67, etc.), although FIGURES 3a and 4 show the actual construction. Thus, the signal on line 112, when present, will prevent the stored data in column a of register 60 from reaching the resistors of all matrix tie points with column a. Exactly how this is done is shown in detail in FIGURES 3a and 4, and is described below.

The coincidence And gates 88–96 have as individual inputs the lines in cables 68–76 connected with each stage of their corresponding column of register 60. The output 98–106 of gates 88–96 are connected with respective "set" terminals of flip-flops 108, 109, 111, 113 and 115, and the output line of each flip-flop is shown connected to its bus. Thus, for flip-flop 108, the output line 110 is connected with bus 112, and the bus is connected to the inhibit terminal of an inhibit gate 120 (part of inhibitor 114 of FIG. 3) in the "T" matrix. There is one gate 120 (FIG. 3a) for each of the input lines to the resistor matrices. For every point in every matrix using column a there will be a connection between bus 112 and the inhibit terminal of the corresponding gate. For example, matrix 66 for the numeral "7" has a connection with the stage 7a and therefore line 122 is connected between the inhibit terminal of the corresponding inhibit gate and bus 112. In a like fashion the flip-flop 109 for column b of register 60 has an output line 128 attached to a bus 130 (FIG. 3a) which services all of the gates 120 for those points of all matrices which are connected with the b column of register 60. The same applies to the other three flip-flops for the remaining columns c, d and e of register 60. It is now evident that I eliminate the mark from consideration by the logic circuitry of the machine by disconnecting or cutting off those points in the matrices which are connected with the part of register 60 storing the mark. Since the inhibit signals are wanted until a character-identity decision is made, and not after, the "read" signal on line 80 (FIG. 3a) delayed at 81 and conducted on line 83 is used to reset the flip-flops 108–115. It is deemed apparent that for horizontal marks (FIG. 1b), the same circuits are used, but gates 98, 100, 102, etc., will be connected to the rows 1–9 instead of the columns in register 60. Buses 112, 130, etc., will be connected to the corresponding points of the correlation matrices.

FIGURE 4 shows one of several possible ways to construct inhibit gates 120 or other inhibit gates used throughout my disclosure. I show a PNP transistor 131 whose base is connected to bus 112. The collector of the transistor is connected to line 7a i.e., the line in which is attached to point 7a of register 60. The emitter of transistor 131 is connected with one of the resistors of matrix 65. When flip-flop 108 is set, transistor 131 is biased (by a signal on bus 112) to cut-off so that any signal appearing on line 7a will not be conducted to resistor matrix 65. Thus, the gate is inhibited. However, when there is no signal on line 112, transistor 131 conducts, and any signal appearing on line 7a is impressed on the connected resistor of the matrix 65.

I have shown a variation of my invention in FIGURE 3b where only column a of register 60 is reproduced. In place of coincidence gate 98, I have shown an analog adder 98a made of resistors connected to the individual stages of column a. The output line 140 of adder 98a is connected to a one-shot multi-vibrator 142. When it fires there is a signal on line 143 which sets flip-flop 108 of FIGURE 3a. By having the one-shot multi-vibrator 142 designed with an adjustable threshold, I provide an adjustment enabling me to ignore, if I wish, one or more of the points in the register column a and still conclude that a vertical line is a field mark: In some cases, the printing of the field mark may have a very small break in it, in which case the embodiment of FIGURE 3b will permit me to ignore this break. It is understood that the circuits shown in FIGURE 3b are duplicated for all columns of the register.

FIGURE 3c shows another variation where the column of the shift register is interrogated by coincidence gate 98b having input data connections with only selected points of the shift register. This form of the invention has the effect of ignoring the center part of the field mark and looking for the top and bottom thereof as stored in the register. Column a (FIGURE 3c) is shown as being thirty-two stages tall, and it may be assumed that the character will only occupy about twenty of these stages. Thus, when a field mark is along vertical line on printed form, there is justification for concluding that the presence of "black" at the top and bottom of the column is, in fact, indicative of a field mark.

Although vertical lines are often used as marks and as applied to printed forms containing ruled markings, boxes, etc., to define fields, my invention is not restricted to vertical, horizontal, or skewed marks. The marks may have any suitable configuration such as dot-dash lines which would be recognized as a code by the mark recognizing circuits shown herein, a combination of lines, a particular character, symbol, etc., and the only modification required of my circuits is to select the corresponding lines 28, 42 in FIGURE 2 or lines in cables 68, 70, etc., in FIGURE 3 to recognize the configurations of the symbol, lines, etc., defining the mark.

It is understood that various other changes and modifications may be made without departing from the protection of the following claims.

I claim:

1. In an optical reading machine for characters on a contrasting area where the area has a mark which is spectrally substantially indistinguishable from the characters, an examination device for said area to provide outputs corresponding to the mark and a character, mark detecting means to examine said outputs for a mark and to provide a mark signal, recognition means responsive to said outputs to identify the character, and means between said examining means and said recognition means and responsive to said signal for separating said outputs corresponding to the mark from use by said recognition means in identifying the character.

2. The subject matter of claim 1 wherein said mark is dimensionally distinguishable from the characters, and said examining means examine said outputs for outputs defining a dimension which signifies the mark.

3. In a character reading machine for documents having characters and marks which are spectrally substantially indistinguishable from the characters; a single examination device which responds to the characters and to the marks to provide outputs corresponding to the same; processing means responsive to said outputs corresponding to the characters and marks from the same examination device to provide electrical signals; means including a comparator to identify the unknown character on the basis of said signals; and means associated with said processing means, for eliminating said electrical signals which correspond to said marks from consideration by said comparator in identifying the unknown characters.

4. In an optical reading machine for identifying characters on an area where the area has additional marks which are spectrally substantially indistinguishable from the characters, said machine including an examination device for said area, processing means responsive to said examination device to provide outputs corresponding to an examined character and a mark, decision means responsive to said outputs to develop signals on which to base a character-identity decision, and means to detect the presence of said mark ahead of said character-identity decision means and to require said decision means to at least reduce the effect of said mark in identifying examined character.

5. The reading machine of claim 4 wherein mark detecting means include interrogation means to determine the presence of the mark by the size thereof relative to the examined character.

6. In a reading machine for characters on an optically contrasting area where said area has at least one additional mark whose reflectance is similar to the characters and whose location relative to a character can vary such that the mark may touch a character, said machine having means to form an image of said area, a photosensitive examination device on which said image is formed, said device being sensitive to an unknown character and said mark of said area-image, processing means providing outputs which correspond to both said character and mark, means responsive to said outputs to provide signals by which to identify said unknown character, and a comparator responsive to said signals to identify the unknown character, the improvement comprising:
 (a) means to detect the mark; and
 (b) means operatively connected with said processing means for suppressing said detected mark ahead of said comparator.

7. The reading machine of claim 6 wherein:
 (a–1) said mark detecting means include means to interrogate said processing means for data corresponding to a representation in the image which is larger than the largest expected character.

8. The subject matter of claim 6 wherein:
 (a–2) said interrogation means are operatively connected with said photosensitive means.

9. The subject matter of claim 7 wherein:
 (a–3) said processing means include a register and said interrogation means are operatively connected with said register.

10. In an optical character reading machine for characters on an area whereon there is a mark which is spectrally substantially indistinguishable from an adjacent character and the mark is dimensionally distinguishable from said character, and the mark is positioned in an unpredictable location relative to the character including such a location as to pass through a part of the character; scanning means providing outputs corresponding to said character and the mark, mark detecting means to examine said outputs and provide a signal upon detection of the outputs defining said mark by the physical dimension represented thereby, recognition circuits, means responsive to said signal to suppress the outputs representing said mark, and means conducting the remaining outputs to said recognition circuits so that the character-identity decision is based upon said remaining outputs to the exclusion of the outputs representing said mark.

11. The reading machine of claim 10 and a temporary storage device between said scanning means and said recognition circuits to accept and store said scanning means outputs, and said suppressing means being operative between said scanning means and said storage device to suppress said outputs representing said mark ahead of said storage device.

12. The reading machine of claim 10 and a temporary storage device between said scanning means and said recognition circuits to accept and store said scanning means outputs, and said suppressing means being operative between said storage device and said recognition circuits to suppress said outputs representing said mark ahead of said recognition circuits but after temporary storage thereof in said storage device.

References Cited by the Examiner
UNITED STATES PATENTS

| | | | |
|---|---|---|---|
| 3,056,033 | 9/62 | Shepard | 340—146.3 |
| 3,102,995 | 9/63 | Abbott et al. | |
| 3,105,956 | 10/63 | Greanias et al. | |

OTHER REFERENCES

Page 150, Fundamental Principles of Switching Circuits and Systems, American Telephone and Telegraph Co., 1961, FIG. 9–3.

MALCOLM A. MORRISON, *Primary Examiner.*